(12) United States Patent
Dubey et al.

(10) Patent No.: US 9,575,985 B2
(45) Date of Patent: Feb. 21, 2017

(54) DISTRIBUTED LOCK ADMINISTRATION

(75) Inventors: Saurabh Dubey, Jamshedpur (IN); Kalyanasundaram S., Kumbakonam (IN)

(73) Assignee: Novell, Inc., Provo, UT (US)

( * ) Notice: Subject to any disclaimer, the term of this patent is extended or adjusted under 35 U.S.C. 154(b) by 1054 days.

(21) Appl. No.: 12/632,002

(22) Filed: Dec. 7, 2009

(65) Prior Publication Data
US 2011/0137879 A1   Jun. 9, 2011

(51) Int. Cl.
  *G06F 7/00* (2006.01)
  *G06F 17/30* (2006.01)
  *G06F 17/00* (2006.01)

(52) U.S. Cl.
  CPC .. *G06F 17/30171* (2013.01); *G06F 17/30362* (2013.01); *G06F 17/30575* (2013.01); *G06F 17/30578* (2013.01)

(58) Field of Classification Search
  CPC ......... G06F 17/30575; G06F 17/30578; G06F 17/30362; G06F 17/30171
  USPC ................ 707/623, 610, 999.001–999.005
  See application file for complete search history.

(56) References Cited

U.S. PATENT DOCUMENTS

| | | | |
|---|---|---|---|
| 4,887,204 A * | 12/1989 | Johnson et al. | |
| 5,682,537 A * | 10/1997 | Davies et al. | 710/200 |
| 5,893,140 A * | 4/1999 | Vahalia et al. | 711/118 |
| 5,987,506 A | 11/1999 | Carter et al. | |
| 6,385,625 B1 * | 5/2002 | Slaughter | |
| 6,842,754 B2 * | 1/2005 | Muntz | |
| 7,433,928 B1 * | 10/2008 | Ranade et al. | 709/216 |
| 2003/0140177 A1 * | 7/2003 | Arajs et al. | 709/315 |
| 2003/0145210 A1 * | 7/2003 | Taylor | 713/182 |
| 2005/0086384 A1 * | 4/2005 | Ernst | 709/248 |
| 2005/0086661 A1 * | 4/2005 | Monnie et al. | 719/310 |
| 2006/0129556 A1 * | 6/2006 | Reuter | 707/8 |
| 2006/0184528 A1 * | 8/2006 | Rodeh | 707/8 |
| 2006/0212573 A1 * | 9/2006 | Loaiza et al. | 709/225 |
| 2008/0133775 A1 * | 6/2008 | Peterson et al. | 709/248 |
| 2008/0209433 A1 * | 8/2008 | McKenney | 718/104 |
| 2008/0243847 A1 * | 10/2008 | Rasmussen | 707/8 |
| 2008/0288811 A1 * | 11/2008 | Sudhakar | 714/4 |
| 2009/0019098 A1 * | 1/2009 | Gunda et al. | 707/205 |
| 2009/0271412 A1 * | 10/2009 | Lacapra et al. | 707/10 |

FOREIGN PATENT DOCUMENTS

EP        0278312 B1     10/1994

* cited by examiner

*Primary Examiner* — Kannan Shanmugasundaram
(74) *Attorney, Agent, or Firm* — Schwegman Lundberg & Woessner, P.A.

(57) ABSTRACT

Apparatus, systems, and methods may operate to grant a renewable lease synchronization lock to a node for a file having copies distributed among a group of nodes that is unsynchronized and for which no write lock has already been granted. The synchronization lock disables modification of the file, and enables synchronization of a file copy on the requesting node to a synchronization master copy on another node in the group. A renewable lease write lock can be granted to a node in the group when the file is synchronized and when the write lock has not already been granted. The write lock disables granting the synchronization lock, and enables file modification. The synchronization lock and write lock are maintained until their respective leases expire. Additional apparatus, systems, and methods are disclosed.

21 Claims, 4 Drawing Sheets

DISTRIBUTED LOCK ADMINISTRATION

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent records, but otherwise reserves all copyright rights whatsoever. Copyright 2009 Novell, Inc.

BACKGROUND

In a distributed data processing environment, multiple copies of the same file may be kept on multiple nodes to provide faster access and data redundancy. A replication protocol based on modification time stamps can operate to maintain integrity between the copies, eventually updating unmodified copies of the file to include changes as they are made. However, this means that later modifications receive update precedence over earlier modifications, when each occurs after the last synchronization event. Thus, some (earlier) modifications can be ignored, resulting in permanent data loss.

SUMMARY

In various embodiments, apparatus, systems, and methods that support distributed lock administration are provided. For example, in some embodiments, distributed locks are administered by granting a renewable lease synchronization lock to a requesting node within a group of nodes when a file having copies distributed within the group is unsynchronized and no write lock has already been granted. The synchronization lock disables modification of the file, and enables the copy of the file on the requesting node to be synchronized to a master copy on another node in the group.

A renewable lease write lock can be granted to a requesting node within the group when the file is synchronized and the write lock has not already been granted. The write lock disables granting the synchronization lock, and enables file modification. The synchronization lock can be maintained until its lease expires, as can the write lock. Additional embodiments are described, and along with the foregoing example, will be set forth in detail below.

DETAILED DESCRIPTION

Figure 1:
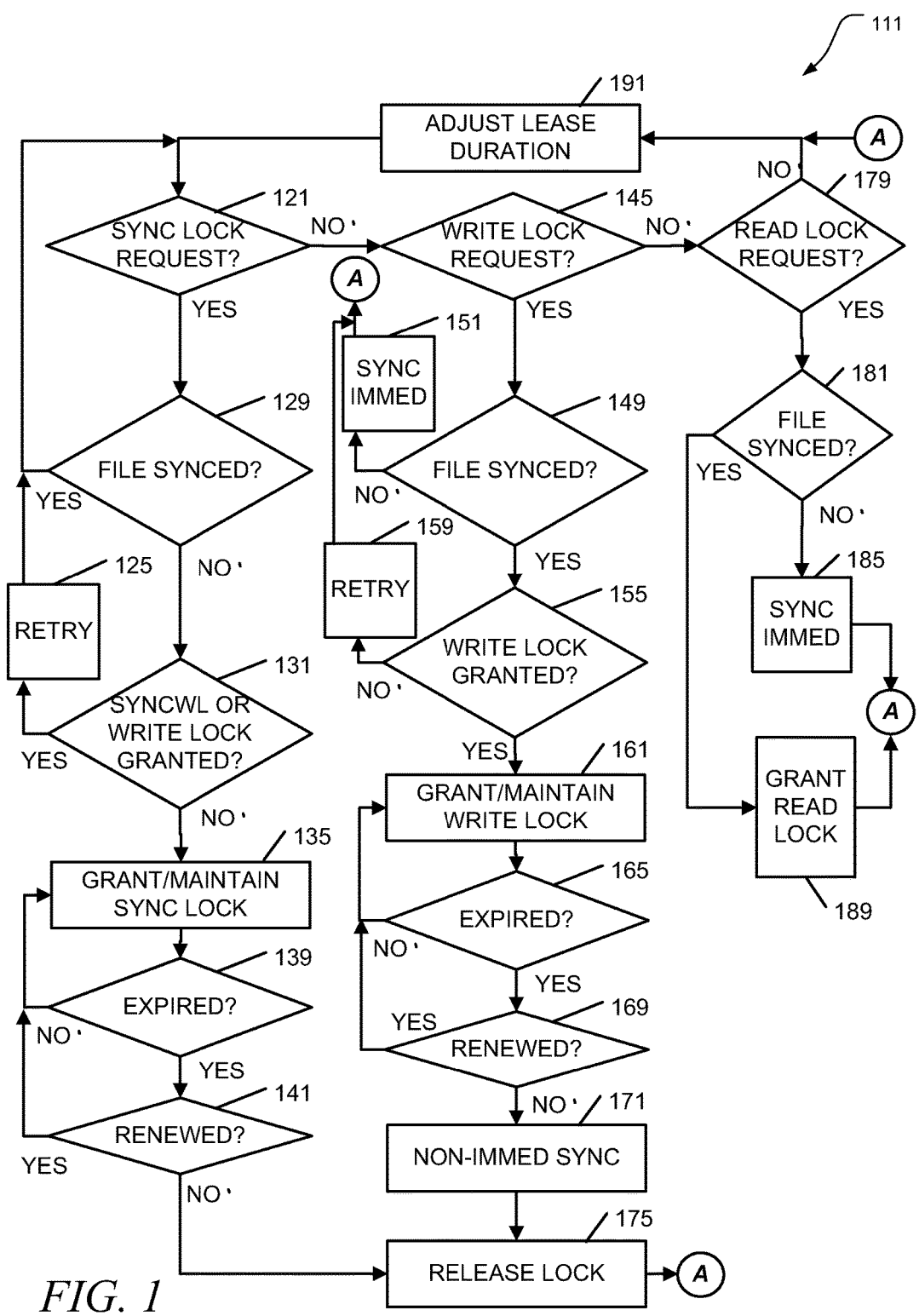
FIG. 1 is a flow diagram illustrating methods of distributed lock administration according to various embodiments of the invention.

Some of the embodiments described herein operate to use synchronization locks, write locks, and read locks that are managed by a centralized lock manager (CLM). Renewable leases for the synchronization and write locks are issued to replication agents/programs. In some embodiments, lock management occurs using a two-tier architecture, with lock clients (LC) running on each node participating in the distributed system group of nodes, and a CLM running on a node designated as the lock server. Individual LCs maintain lock information pertaining to their own processes, while the CLM maintains information about all of the locks issued to all of the LCs for each file.

The following are locks that can be acquired by processes running on any of the nodes in the distributed system:

Synchronization Write Lock (SYNCWL) or "synchronization lock": this lock can be obtained by the replication process of a distributed file system (DFS) client running on one of the nodes participating in a group of nodes, when attempting to update the file's local instance from a synchronization master copy of the file (i.e., the last modified instance of the file, existing on another node in the group). The usual process of DFS replication, known to those of ordinary skill in the art, can be used to update the local instance.

Write Lock (WL) or "write lock": a process on one of the nodes in the group that operates to modify a copy of the file on that node can request a WL. Only one process in the entire distributed system/group can hold a WL on a file. This implies that a WL granted for one instance of the file blocks all write accesses to any other instance of that same file, throughout the system.

Read Lock (RL) or "read lock": a process that operates to read an instance of the file can request a RL. Multiple processes can hold RLs on a single instance (or different instances) of a file within the system.

The CLM maintains the locking information for each file (and each instance of that file) exposed to the distributed system. It maintains the lock information in its cache and periodically copies the cached information to a database, which can be located on the same network, or a different network (e.g., to provide some degree of fault tolerance). The CLM creates and maintains a hash table for each file, with the absolute file name used as a key, and its lock details as values.

Locks are not granted permanently—they are leased. LCs should renew their leases on locks prior to expiration if more time is needed. This mechanism avoid files remaining locked forever if a client dies prior to releasing a lock that has been granted. For example, the system administrator may set up the system so that an LC renews its locks when 60% percent of the lock lease time has passed, such that 40% of the lease time remains prior to lease expiration. Once the lock lease period expires without being renewed, the CLM simply terminates the lock that was previously granted. In some embodiments, the CLM is able to increase and decrease the duration of the lock lease period based on network traffic loading, providing a mechanism to cope with surges in locking requests, etc.

Thus, in various embodiments, each node operates to synchronize its own copy of the file with the current synchronization master copy (which is the most recently-modified instance of file) after being notified that synchronization is needed by the CLM. That is, whenever the client participating in the replication process acquires a write lock and updates the file instance it is using, the updated instance of the file will become the synchronization master copy for that particular file going forward. This instance remains as the synchronization master copy until a new successful write occurs with respect to a different instance of the same file. In this way, the synchronization master copy can move from node to node, depending on which node made the latest (write) modification to its instance of the file copy.

A synchronization lock can be obtained by an LC even if read locks have been granted on the same instance which is to be synchronized. This is possible because the local client (reading the file) maintains a cached copy of the file, which can be refreshed or notified to implement a refresh operation after synchronization has occurred. Thus, a read lock and a synchronization lock are not mutually exclusive.

One example of such operations includes a process operating on a node with a distributed group of nodes requesting a read lock. When the CLM notes the existence of a SYNC_REQUIRED flag for that instance of the file, the CLM can operate to notify the requesting node that its file instance should be synchronized immediately—prior to obtaining the read lock. Another example involves the normal synchronization process of the DFS system, under which the DFS client/daemon procures a synchronization lock to update the instance of the file on that client, based on the DFS-defined interval of synchronization. Other examples of implementing a distributed lock administration system will now be presented in detail.

In the following description of an example embodiment, an assumption is made for purposes of clarity and simplicity. The assumption is that all resources (e.g., files) being shared in the distributed network are placed under a global, known name space. Thus, each file being shared or made accessible to other processes and nodes within the network should have a unique name within the network to prevent a naming conflict. The common name space allows defining a directory structure, with the name space being the root of the defined structure. A file exposed on the distributed network will by default fall into the root directory, unless and until being defined otherwise, using a directory hierarchy created within the network.

In this example embodiment, all locks granted by the CLM are valid for a fixed duration, defined at the time of issuing the lock. The LCs are made aware of this duration at the same time. Any process that desires continued access to an instance of the file should operate to renew the lock by requesting renewal from the CLM. By leasing locks, a particular file instance is not locked forever when the locking process abruptly dies or communication with the node running the locking process is lost. Deadlocks between processes are thus avoided. LCs running on each node can compute the next renewal deadline and operate to timely initiate the lock renewal process with the CLM if the process that owns the lock needs additional time to access the file instance.

The CLM may provide a grace period after the lock duration expires, during which it waits before releasing the to-be-renewed lock. This provides some buffering capability to handle network latency and renewal request packet loss.

In order to cope up with heavy network loading and a sudden surge in locking requests, the CLM may operate according to an algorithm that increases/decreases lock duration, depending on network traffic. Any grace period in effect can similarly be changed by the CLM according to the change in the lock duration (e.g., as a percentage of the revised lock duration).

Notifications that can be exchanged between the CLM and LCs to inform each entity of the occurrence of selected events. These events are different from the communications involved in the lock grant/renewal process, and provide a significant improvement in operations. Some of these notifications include:

'File Modified' notification: issued by the CLM to all nodes holding an instance of the file whenever the file has been modified (e.g., when a WL on that file changes state from ACTIVE to INACTIVE).

'File Instance Updated' notification: issued by an LC to the CLM in response to receiving a 'File Modified' notification, to indicate that the instance of the file on the LC has been synchronized to include the modification.

'Will Update Later' notification: issued by an LC to the CLM in response to receiving a 'File Modified' notification when the LC is configured for lazy synchronization (e.g., normal DFS synchronization), or the LC otherwise determines that synchronization of its file instance is to be postponed. This causes the CLM to enter that node's identity in a 'SYNC_REQUIRED' queue to indicate that a file synchronization operation is pending for the instance associated with that particular LC, but is not yet complete.

'Sync Immediate' notification: issued by the CLM to an LC when a RL/WL request is received by the CLM, and the requesting node's file instance is still present in the 'SYNC_REQUIRED' queue associated with that file.

'Sync Done' notification: issued by the LC to the CLM as a follow-up notification when the sync is completed by the LC. While the 'File Instance Updated' is issued by the LC to the CLM when it changes are synchronized immediately upon receipt of a 'File Updated" notification', the LC responds to the CLM with a 'Sync Done' notification to mark the actual completion of the synchronization process, once it is completed after a lazy synchronization ('Will Update Later' sent at an earlier time), or a 'Sync_Immediate' notification.

Each type of lock (RL, WL, or SYNCWL) may be maintained as a separate hash table, which includes information pertaining to each lock of that type that has been granted. A typical hash table entry for a file named 'foo' maintained in a cache for the CLM may appear in a format similar to that shown for the "CLM FILE HASH TABLE ENTRY" of APPENDIX A, attached hereto and incorporated herein in its entirety.

The CLM maintains a defined state for each file. For example, the file can be noted to occupy a 'SYNCED' state or a 'TRANSIENT' state. WLs are only granted to the file when it is in a 'SYNCED' state, which means that a file can only be altered if it is in the 'SYNCED' state. The SYNCWL is only granted when a file is in the 'TRANSIENT' state, since the SYNCWL is to be used for file synchronization, and not modification.

A file can have multiple simultaneous RLs on one or multiple instances, and this information can be captured by the CLM. For example, an RL held in the CLM cache may include the following information:

Lockid: unique identification (ID) associated with that lock. This ID is unique only with respect to that file, and not globally.

Lockingpid: process identifier (PID) of the process that holds the lock.

Lockinghostid: unique identifier of the system node where the locking process is running LockGrantTime: time stamp when the lock was granted.

LockDuration: duration for which the lock is valid.

LockRenewalDelay: duration after which the process must renew the lock so that access to the file instance may continue.

LockedFileInstance (hostid:\\FileLocation): the locked instance of file being read.

Apart from individual RL information, the CLM may also maintain the count of the RL issued for a particular file, where the number of instances of the file being accessed throughout the system are known. The CLM uses the RL count to ensure that all of the instances are synced after a file modification event occurs, before any new WLs are granted for that file. In this way, the CLM is aware of the number of nodes/LCs that currently hold a valid read lock over an instance of that file.

When any instance of the file is modified, a 'File Modified' notification can be sent to all the nodes bearing instances of the file, so that the LCs can reply back with a 'File Instance Updated' notification, once the instance of that file (on the machine running the LC) has been updated. The number of 'File Instance Updated' notifications received tells the CLM how many nodes have actually synchronized the changes included in the last modification. So, before granting the next WL within the system for that file, the CLM can operate to compare the number of 'File Instance Updated' notifications received with the number of open file instances, signified by the RL count. If these totals do not match, then some nodes exist that have yet to send the 'Will Update Later' notification, in response to CLM 'File Modified' notification previously transmitted, and recorded using the 'SYNC_REQUIRED' queue. The CLM can then send a 'SYNC Immediate' notification to the LCs running on these nodes, granting the requested WL only after the remaining nodes report that synchronization is complete.

A WL held in the cache of the CLM for a particular file might include the following information:
  State (0=Inactive, 1=Active): defines the state of the WL (active/inactive).
  Lockingpid: PID of the process that holds the lock.
  LockingHostid: unique identifier of the system node running the locking process.
  LockGrantTime: time stamp when the lock was granted.
  LockDuration: duration for which the lock is valid.
  LockRenewalDelay: duration after which the process must renew the lock so that access to the file instance may continue.
  LockedFileInstance (Hostid:\\FileLocation): the locked instance of the file being modified.

The last modified instance of the file (e.g., the location held in the last WL issued for the file, which is now INACTIVE), acts as the replication provider for the DFS synchronization process, since this instance has become the synchronization master copy of the file.

A SYNCWL held in the cache of the CLM for a particular file might include the following information:
  Lockingpid: PID of the process that holds the lock (e.g., the synchronization process of the DFS).
  LockingHostid: unique identifier of the system node where the locking process is running
  LockGrantTime: time stamp when the lock was granted.
  LockDuration: duration for which the lock is valid.
  LockRenewalDelay: duration after which the lock must be renewed for any further access to the file's instance.
  LockedFileInstance (Hostid:\\FileLocation): the locked file instance being updated.
  CorrepsondingRLCount: the corresponding RL count.

LCs can also maintain lock information. In this case, the information pertaining to all locks held by the processes running on a particular node associated with the LC. For example, such information can be maintained in a hash table format, similar to what is shown for the "LC NODE HASH TABLE ENTRY" of APPENDIX A, attached hereto and incorporated herein in its entirety.

An RL held in an LC cache may include the following information:
  LockingPid: PID of the process that has been granted the RL
  LockedFileInstance (Hostid:\\FileLocation): the locked file instance being read.
  NextLockRenewalTimeStamp: next lock renewal time stamp A WL held in an LC cache may include the following information:
  LockingPid: PID of the process that has been granted the RL
  LockedFileInstance (Hostid:\\FileLocation): the locked file instance being updated.
  NextLockRenewalTimeStamp: next lock renewal time stamp.

A SYNCWL issued to the DFS synchronization process running on an LC may also be held in a cache, with the following information:
  pid_of_DFS_sync_process: PID of the DFS synchronization process.
  Lockedfile (localFilelocation): local file instance being updated.
  ReplicationProvider (Hostid:\\FileLocation): remote file instance acting as the replication provider.
  NextLockRenewalTimeStamp: next lock renewal time stamp.

The LC can be configured to perform immediate synchronization (e.g., priority sync using the DFS) or lazy synchronization (e.g., DFS normal sync), defaulting to lazy synchronization. The notification of 'File Updated' would thus be sent by the LC only after the local copy has been synchronized with the master synchronization copy. If the file instance is refreshed, the updated view should be available immediately, or when the instance is next opened. The DFS and the LC cooperate internally to update the local file instance on the basis of the DFS synchronization configuration (e.g., lazy sync or priority sync) whenever a 'File Modified' notification is received and verified (e.g., using a checksum and modified time stamp validation to determine whether the local file instance needs an update, or whether this has already been done). Once the local file instance is synchronized from the current replication provider instance (e.g., the synchronization master copy), the DFS can notify all nodes having open instances of the file to reload the read-only cache to provide each process accessing the file with an updated copy.

The operation of granting a lock can be divided into two parts for each lock type: the request to grant a lock, and the reply. Each differ in the information that is communicated between the LC and the CLM. The operation for each lock type will now be explained in more detail.

In the first part of the RL request/grant operation, the need to read a file (local or remote) arises for a process, and thus requires an RL on that file's instance. The process of RL request and provision is transparent to the reader process and is handled internally by the LC on the node running the process. The LC issues a 'grant RL' request to the CLM with some or all of the following information contained in the request: pid of the process for which the RL is desired, information about the file instance on which RL is desired (Hostid:\\fileLocation), and the identity of its host.

In the second part of the RL request/grant operation, upon receipt of the 'grant RL' request, the same is entered in the RL queue. A single queue for all the RL requests for all the files is maintained at the CLM to promote faster RL processing. Once the RL grant request is popped out of the RL queue, the following checks may be made:
- whether the file is in a SYNCED state or not—if not, an 'RL grant failed' message is issued to LC with a probable time after which a retry should be attempted.
- whether the LC's node identification, on which the file instance is located (and it is this file instance on which the RL is requested) is present in the 'SYNC_REQUIRED' queue—if so, the CLM returns an 'RL grant failed' message, followed by a 'Sync Immediate' notification to the LC running on the node where the file instance is present
- if the file is in a SYNCED state and the requesting host identifier is not present in the 'SYNC_REQUIRED' queue, then the RL is granted and the 'RL grant success' message is sent to the requesting LC with some or all of the following information: LockingPid: PID of the process that now owns the RL; LockedFileInstance (Hostid:\\FileLocation): the locked file instance, the instance being read; and NextLockRenewalTimeStamp: next lock renewal time stamp.

In the first part of the WL request/grant operation, a process asserts the need to access and update a file. The LC running on the same node as the process identifies the attempt to access and update the file, and initiates a WL grant request transaction with the CLM. A 'grant WL' request is sent to the CLM with some or all of the following information: pid of the process for which the WL is desired, information about the file instance on which WL is desired (Hostid:\\fileLocation), and the identity of its host.

In the second part of the WL request/grant operation, the WL request is immediately taken up for processing by the CLM upon receipt, and the following checks are made in some embodiments:
- whether the instance of the file on which the WL is requested is in the SYNCED state or not. If not, a 'WL grant failed' message is sent to the requesting LC, with a probable time after which a retry should be attempted.
- if the file is in the SYNCED state, the CLM then checks whether a WL already exists on the file, and whether the WL is in the ACTIVE state. If so, a 'WL grant failed' message is returned to the requesting LC with a probable time to retry. This retry time can be computed using the 'LockrenewalTimestamp' on the existing active WL added to the Lockrenewalgraceperiod.
- If the requesting node identification is present in the 'SYNC_REQUIRED' queue, the CLM returns a 'WL grant failed' message, followed by a 'Sync Immediate' notification that is issued for the file instance for which the WL was requested.
- If the instance of the file is in the SYNCED state and there exists no active WL on the file, the CLM grants the WL to the requesting LC and returns a 'WL granted' message with some or all of the following information: LockingPid: process identifier of the process that now owns the WL; LockedFileInstance (Hostid:\\FileLocation): the locked file instance, the instance being accessed; and NextLockRenewalTimeStamp: next lock renewal time stamp.

The synchronization lock or SYNCWL is a lock that in some embodiments can only be requested by and issued to the DFS sync process running on the LC node from which the request originates. The CLM does not necessarily have a mechanism to identify that the process requesting the SYNCWL is indeed the synchronization process of the DFS or not, so it is up to the LCs in some embodiments to ensure that SYNCWL requests are only made by their DFS sync process. SYNCWL requests are made in response to a 'File Modified' notification, perhaps immediately, or as a part of the usual DFS synchronization process.

In the first part of the SYNCWL request/grant operation, the LC sends a 'grant SYNCWL' request to the CLM containing some or all of the following information: pid of the sync process of the DFS, the identity of the host, and information about the file instance on which SYNCWL is desired (Hostid:\\fileLocation). This may be the remote file instance, acting as a replication provider.

In the second part of the SYNCWL request/grant operation, upon receiving a 'grant SYNCWL' request, the CLM may operate to process it immediately in some embodiments. The following checks may be performed in response:
- if the file instance is not in the 'SYNCED' state, a 'SYNCWL grant failed' message is returned to the requesting LC with the probable time to retry, which can be computed using LockrenewalTimestamp added to the Lockrenewalgraceperiod if there already exists an SYNCWL for the file. In case an active WL exists on the file, the retry time can be computed based upon the time taken for a packet transaction with the LC requesting the SYNCWL as LockrenewalTimestamp added to the Lockrenewalgraceperiod for the active WL and some padding (to provide for network latency), since by that time the new 'File Modified' notification should have been sent to the requesting LC.
- If the file is in the 'SYNCED' state and no active WL or SYNCWL exists on the file, the CLM may grant the SYNCWL and issue a 'SYNCWL granted' message to the requesting LC, containing some or all of the following information: LockingPid: PID of the process owning the SYNCWL (DFS sync process); LockedFileInstance (Hostid:\\FileLocation): the locked file instance, the instance which is to act as the replication provider; and NextLockRenewalTimeStamp: next lock renewal time stamp.

As noted previously, notifications, which occur outside the lock request/grant operations, can be exchanged between the CLM and LCs running on the nodes participating in the distributed system to facilitate the update and synchronization process. In some embodiments, the CLM and each LC can be divided into two functional components. These two components comprise a lock management subsystem, and an event/notification management subsystem. Both subsystems cooperate to provide for efficient CLM and LC functionality.

The event system in both the CLM and the LC can operate to provide the following types of events/notifications:
- 'File Modified' notification: whenever a file is modified (a WL on that file changes state from ACTIVE to INACTIVE), the CLM can operate to notify all nodes bearing an instance of that file about the modification. The CLM can determine the list of unique host identifiers from the 'LockedFileInstance' field of all the RLs existing on that file. The CLM can then send out a 'File Modified' notification to all LCs running on these nodes using multicast messaging. The 'File Modified' notification may contain some or all of the following information: file which was modified (e.g., file name), checksum of the recently updated file instance, Last-Modified time stamp of the modified file instance.
- 'File Instance Updated' notification: issued by the LC to the CLM in response to the 'File Modified' notification. This notification is issued when synchronization is accomplished, upon receipt of the 'File Modified' notification as an immediate synchronization, or if the file's instance was already up-to-date with the version as indicated by the 'File Modified' notification (e.g., the local file instance has the same checksum and modified time stamp as is recorded in the 'File Modified' notification). The 'File Instance Updated' notification may contain some or all of the following information: name of the file updated, sent as an acknowledgment (ACK) to the 'File Modified' notification received by the LC (e.g., the sequence number of this notification packet can be the sequence number of the 'File Modified' notification packet+1).

'Will Update Later' notification: issued by the LC to the CLM in response the receiving the 'File Modified' notification when the LC is configured for lazy sync (e.g., the normal DFS synchronization operational mode) and the file instance on the LC node is not updated to the same revision noted in the 'File Modified' notification. This causes the CLM to put the identity of the node in the 'SYNC_REQUIRED' queue to indicate that a file synchronization operation is pending, but not yet complete. The 'Will Update Later' notification contains some or all of the following information: name of the file to be updated, sent as an acknowledgment (ACK) to the 'File Modified' notification received by the LC (e.g., the sequence number of this notification packet can be the sequence number of the 'File Modified' notification packet+1).

'Sync Immediate' notification: issued by the CLM to the LC when the CLM receives an RL/WL request for a node's file instance, and the node identity is present in the 'SYNC_REQUIRED' queue. This notification is sent so that any new locks being obtained on that file instance are granted on an updated copy of the file, and not on a stale copy. This notification overrides the LC's DFS synchronization configuration (e.g., immediate sync or lazy sync) and triggers a synchronization operation immediately. Once the LC updates the local file's instance it responds back to the CLM with a 'File Instance Updated' notification as an acknowledgment (e.g., ACK) to the 'Sync Immediate' notification. The 'Sync Immediate' notification may contain some or all of the following information: file name to be updated, remote file location (Hostid:\\file location) which acts as the replication master, and is used by the LC requesting a SYNCWL for immediate synchronization.

'Sync Done' notification: issued by the LC to the CLM. This is a follow-up notification issued by an LC that earlier informed the CLM with a 'Will Update Later' notification in response to receiving a 'File Modified' notification, or as an acknowledgment (ACK) to the 'Sync Immediate' notification received from the CLM once the synchronization has been completed as a result of that notification. On receiving this notification, the CLM can operate to remove the identity of the node from the 'SYNC_REQUIRED' queue. Some or all of the following information may be present the in 'Sync Done' notification: name of the file updated, sent as an acknowledgment (ACK) to the 'Sync Immediate' notification (e.g., the sequence number of this notification packet may be the sequence number of the 'Sync Immediate' notification packet+1) or as a follow-up transmission to the earlier 'Will Update Later' notification sent out by the LC.

The synchronization process of the DFS can be accomplished by obtaining a SYNCWL on the replication provider (e.g., the last modified file instance). However, when the CLM receives a SYNCWL request for a file without first sending a 'File Modified' or a 'Sync Immediate' notification to that client, it schedules the SYNCWL at the beginning of the locking queue for that file—but only if a WL is active on the file. If RLs exist, and no WL exists, the CLM immediately grants the SYNCWL on the file. Otherwise, the SYNCWL is granted after processing the existing WL.

While processing this type of SYNCWL request, (e.g., one not triggered by a "File Modified" or "Sync Immediate" notification), the CLM does not change the state of the file. However, if a pre-existing WL was granted before the SYNCWL, then the notification process would operate to take up the SYNCWL request for processing as the first one of any previously-existing SYNCWL requests.

To ensure the overall integrity of lock request/grant operations, each time a new LC comes into existence, it should be registered with an associated CLM. During registration, both the LC and the CLM can operate to exchange respective public keys. Thereafter, all communication from the LC to the CLM can be encrypted using the public key of the CLM, and all of the communications originating from the CLM that is addressed to the LC can be encrypted using the public key of that LC. Engaging in encrypted communications helps avoid situations where false clients operate to join the replication process by claiming the same identity as a true client, exchanging a public key with the CLM after mistakenly being identified as the true client. As long as the keys are not stolen, encryption will make it difficult for false clients to intrude upon system operations.

For proper identification of each LC, and to distinguish one LC from another, the CLM can maintain a registration table for all LCs that have registered with it. This table may contain some or all of the following information for each LC: the host/node identifier on which LC is running, and the public key of that LC.

Thus, many embodiments of the invention may be realized, and each can be implemented in a variety of architectural platforms, along with various operating and server systems, devices, and applications. Any particular architectural layout or implementation presented herein is therefore provided for purposes of illustration and comprehension only, and is not intended to limit the various embodiments.

FIG. 1 is a flow diagram illustrating methods 111 of distributed lock administration according to various embodiments of the invention. The methods 111 are implemented in a machine-accessible and readable medium and are operational over processes within and among networks. The networks may be wired, wireless, or a combination of wired and wireless. The methods 111 may be implemented as instructions, which when executed by a specific machine, perform the processing depicted in FIG. 1. Given this context, distributed lock administration is now discussed with reference to FIG. 1.

In some embodiments, a processor-implemented method 111 as viewed from the perspective of the CLM, that can be executed on one or more processors that perform the method 111, may include granting synchronization locks and write locks so that synchronization can occur at times other than file modification, maintaining the locks until they expire. A lease on a lock can be extended upon request from the node currently holding the lock, as long as no other node has requested a write lock on the same file.

The method 111 may begin at block 121 with determining whether a synchronization lock request has been made. If so, the method 111 may continue on to block 129, to determine whether the file copy is already synchronized. If so, such as when a DFS synchronization process is operating irrespective of any changes being made, then the method 111 may return to block 121.

If the file copy is not already synchronized, then the method 111 may continue on to block 131, to determine whether a synchronization lock or a write lock has already been granted. If either a synchronization lock or a write lock have already been granted, as determined at block 131, then the method 111 may continue on to block 125 with transmitting an indication of a failure to grant a file lock request when the synchronization lock or write lock have already been granted. The activity at block 125 may include transmitting a time to retry submitting the request. The retry time comprises a suggested time to wait until the lock request may be re-submitted.

If the file is not synchronized and a synchronization/write lock has not already been granted, as determined at blocks 129 and 131, then the method 111 may continue on to block 135 with granting a synchronization lock with a renewable lease to a requesting node included in a group of nodes when a file having copies distributed among the nodes is in an unsynchronized state and when no write lock has already been granted. The synchronization lock is to disable modification of the file, to enable synchronization of one of the copies on the requesting node to another one of the copies comprising a synchronization master copy on another one of the nodes.

The activity at block 135 may include maintaining the synchronization lock while the renewable lease for the synchronization lock is not expired. Thus, if the lease has not expired as determined at block 139, then the method returns to block 135. Otherwise, the method 111 may continue on to block 141, to determine whether the lease has been renewed. The method 111 may comprise granting a request to renew the synchronization lock for a fixed synchronization duration if the synchronization lock has not yet expired at block 141.

If the lease on the synchronization lock has been renewed, then the method 111 may return to block 135. Otherwise, the method 111 may continue on to block 175, and operate to release the synchronization lock (assuming any designated grace period has also expired).

The DFS synchronization process running on node having an unsynchronized copy of the file can make a direct request to acquire a synchronization lock in order to synchronize its copy to the synchronization master copy (e.g., the last successful updated copy, updated by a 'write' operation and not by synchronization). Thus, in some embodiments, the method 111 may comprise receiving a request from the requesting node to synchronize a copy of the file on the requesting node, and granting the synchronization lock to the requesting node only if the synchronization lock and the write lock have not already been granted to another node included in the same group of nodes.

If a synchronization lock request has not been made, as determined at block 121, the method 111 may continue on to determine whether a write lock request has been made at block 145. If so, the method 111 may continue on to block 149, to determine whether the file copy is already synchronized. If not, then an immediate synchronization command is transmitted at block 151.

For example, if the file copy on the node requesting a lock is unsynchronized due to modifications made to the synchronization master copy, and another node requests a write lock to modify its own copy, the CLM can send out a command, such as a sync_immediate message, to the nodes that have not yet synchronized their copy of the file to the synchronization master copy. Thus, in some embodiments, the method 111 comprises determining that the file is in the unsynchronized state and that a write lock has been requested, and transmitting an immediate synchronization command to nodes in the group that have not synchronized their corresponding copies of the file to the synchronization master copy.

If it is determined that the file copy is already synchronized at block 149, then the method 111 may continue on to block 155, to determine whether a write lock has already been granted. If a write lock has already been granted, as determined at block 155, then the method 111 may continue on to block 159 with transmitting an indication of a failure to grant a file lock request when the write lock has already been granted. The activity at block 159 may include transmitting a time to retry submitting the request. The retry time comprises a suggested time to wait until the request may be re-submitted.

If the file is synchronized and a write lock has not already been granted, as determined at blocks 149 and 155, then the method 111 may continue on to block 161 with granting a write lock with a renewable lease to a write requesting node included in a group of nodes when the file is in a synchronized state and when the write lock has not already been granted. The write lock is used to disable granting the synchronization lock, to enable modification of the file.

The activity at block 161 may include maintaining the write lock while the renewable lease for the write lock is not expired. Therefore, if the lease has not expired as determined at block 165, then the method 111 may return to block 161.

Otherwise, if the lease on the write lock has expired, the method 111 may continue on to block 169, to determine whether the lease has been renewed. If so, then the method may return to block 161. Thus, in some embodiments, the method 111 includes granting a request to renew the write lock for a fixed write duration if the write lock has not yet expired.

Whenever a modification to one of the copies occurs, that copy becomes the synchronization master copy, and the CLM can indicate to the other nodes that have copies of the file that synchronization should occur, perhaps by sending a 'File Modified' message to those nodes. The variable SYNC_REQUIRED can represent a flag associated with a node that replies with the 'Will Update Later' notification in response to the receiving a 'File Modified' notification from the CLM. This association helps to identify nodes that require immediate synchronization when a WL request on the same file is received by the CLM. Therefore, the method 111 may comprise determining that a modification to one of the copies has occurred at a modifying one of the nodes, and transmitting a non-immediate synchronization command (e.g., see block 171) to nodes in the group that have not synchronized their corresponding copies of the file to the synchronization master copy.

The method 111 may continue on to block 175, operating to release the write lock (assuming any designated grace period has also expired). Thus, when a renewable lease expires, the corresponding lock can be released or the lease can be extended via renewal. Therefore, some of the methods 111 comprise determining that one of the renewable lease for the synchronization lock or the renewable lease for the write lock have expired (see blocks 139, 165), and releasing the synchronization lock or the write lock, respectively, in response to the determination (see block 175).

Read locks and write locks are not mutually exclusive, so read locks may be granted when a write lock has already been granted, and vice versa. Thus, a read lock can be granted by the CLM to one of the nodes, even if the file has not been completely synchronized throughout all of the other nodes in the group.

Therefore, when the write lock in place, it should be possible to grant a read lock. The read requesting node is not affected by the write lock, because the read-locked client is notified by the CLM whenever a write-locked client modifies a copy of the file. So the read client does not wait for a write lock to be released; its intention is simply to read the content.

The process of reading involves maintaining a copy of the file in the temporary memory or cache. Granting a read lock ensures that the node requesting the lock is registered and has a copy of the file in its cache, so that once the write operation is complete, the same node can be updated to synchronize changes to its copy, or the copy that has been cached during the process of reading the copy.

In many embodiments, the DFS sync process is responsible for synchronizing the changes in a manner that is transparent to the process which has actually requested a read lock via the LC, and is currently holding the copy in a cache. Once the file has been modified, the CLM can operate to notify all nodes that an updated version of the file exists, in case synchronization is desirable.

If no write lock request has been made, as determined by block 145, then the method 111 may continue on to block 179, to determine whether a request for a read lock has been asserted. If so, then the method 111 may continue on to block 181 with determining whether the copy of the file has been synchronized. If the copy has not been synchronized, then the method 111 may continue on to block 185 with transmitting an immediate synchronization command.

If the copy of the file has been synchronized, as determined at block 181, then the method 111 may continue on to block 189, with granting the read lock. Thus, in some embodiments, the method 111 comprises granting a read lock to a read requesting node included in a group of nodes when other read locks or a write lock exist, and when the file is not in the unsynchronized state on at least one node in the group that is not the same as the read requesting node. Thus, to grant a read lock, the file instance for which the read lock is requested should be in a synchronized state. Other instances of the same file can be in any state (e.g., 'SYNCED' or 'TRANSIENT').

Network traffic loading may be monitored, with heavier traffic motivating the CLM to increase lease times (i.e., the time for which each lock lease is valid), and lighter traffic motivating the CLM to decrease lease times. Thus, the method 111 may continue on to block 191 to include adjusting the duration of the renewable lease for a synchronization lock or a write lock based on the network traffic loading. Other embodiments may be realized.

Figure 2:
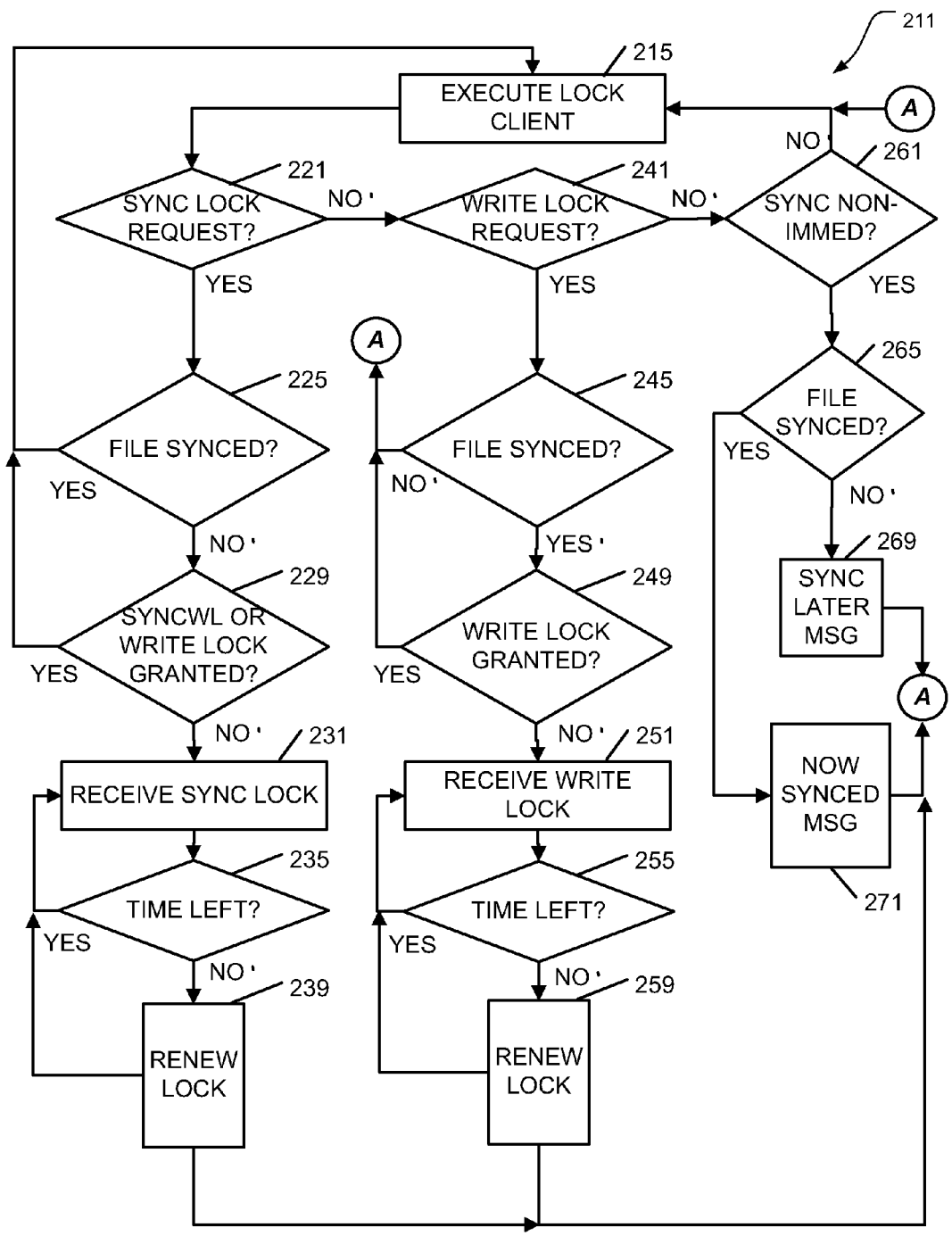
FIG. 2 is a flow diagram illustrating additional methods of distributed lock administration according to various embodiments of the invention.

For example, FIG. 2 is a flow diagram illustrating additional methods 211 of distributed lock administration according to various embodiments of the invention. The methods 211 are implemented in a machine-accessible and readable medium, and are operational over processes within and among networks. The networks may be wired, wireless, or a combination of wired and wireless. The methods 211 may be implemented as instructions, which when accessed by a specific machine, perform the processing depicted in FIG. 2.

In some embodiments, the method 211 can be viewed from the perspective of one of the nodes interacting with the CLM, with synchronization occurring when a synchronization lock is granted, and file modification occurring when a write lock is granted. The locks have renewable leases that can be renewed during a selected time period.

Thus, a processor-implemented method 211 that can be executed on one or more processors that perform the method may begin at block 221 with determining whether a synchronization lock request has been made. If so, the method 211 may continue on to block 225, to determine whether the file copy is already synchronized. If so, then the method 211 may continue on to block 215.

If the file copy is not already synchronized, then the method 211 may continue on to block 229, to determine whether a synchronization lock or a write lock has already been granted. If either a synchronization lock or a write lock have already been granted, as determined at block 229, then the method 211 may continue on to block 215.

If the file is not synchronized and a synchronization/write lock has not already been granted, as determined at blocks 225 and 229, then the method 211 may continue on to block 231 with receiving a synchronization lock with a renewable lease at a requesting node included in a group of nodes when a copy of a file having multiple copies distributed among the group is in an unsynchronized state on the requesting node, and when no write lock has already been granted. The synchronization lock is to disable modification of the file, and to enable synchronization of the copy to another one of the copies comprising a synchronization master copy on another one of the nodes in the group.

If there is sufficient time remaining in the lease, as determined at block 235, the method 211 may return to block 231, continuing to benefit from access to the file copy via the synchronization lock.

If a sufficient amount of time has passed for renewing the lease, as determined at block 235, then the method 211 may continue on to block 239, with renewing the lease. However, if the lease expires prior to renewal, the lock that has been granted will be released.

If a synchronization lock request has not been made, as determined at block 221, the method 211 may continue on to determine whether a write lock request has been made at block 241. If so, the method 211 may continue on to block 245, to determine whether the file copy is already synchronized. If it is determined that the file copy is already synchronized at block 245, then the method 211 may continue on to block 249, to determine whether a write lock has already been granted. If a write lock has not already been granted, as determined at block 249, then the method 211 may continue on to block 251, with receiving a write lock with a renewable lease when the file is in a synchronized state and when the write lock has not already been granted. The write lock is used to disable granting the synchronization lock, and to enable modification of the copy on the requesting node when the requesting node has requested the write lock.

If there is sufficient time remaining in the lease, as determined at block 255, the method 211 may return to block 251, continuing to benefit from access to the file copy via the write lock.

If a sufficient amount of time has passed for renewing the lease, as determined at block 255, then the method 211 may continue on to block 259, with renewing the lease. However, if the lease expires prior to renewal, the lock that has been granted will be released.

The requesting node may be required to renew the lease on its lock prior to expiration to prevent expiration of the lock, such as when some selected amount of time (e.g., 60% or less of the lease time) remains. Therefore, in some embodiments, the method 211 comprises renewing the renewable lease on one of the synchronization lock or the write lock with a CLM when a selected amount of time remains on the renewable lease.

Nodes that have unsynchronized copies of the file do not have to immediately synchronize their own copy when the CLM sends out a non-immediate synchronization request. Thus, if no write lock request has been asserted, as determined at block 241, the method 211 may go on to include, at block 261, receiving a non-immediate synchronization command from a CLM at one of the nodes in the group.

The method 211 may further include refraining from synchronizing the copy on the requesting node, and later determining that the file copy is not yet synchronized at block 265. The method 211 may then continue on to block 269 with transmitting a message to the CLM from one of the nodes in the group to indicate that synchronization of the copy will occur at a later time.

As each node synchronizes its copy of the file to the synchronization master copy, the CLM is notified. Thus, the method 211 may comprise, at block 271, transmitting a message to the CLM from the one of the nodes in the group to indicate that synchronization of its copy has occurred.

Some nodes may use a single LC to regulate application activity with respect to modifying a copy of the file by transmitting requests for locks, and to receiving grants (or refusals to grant) the locks, from a CLM. Thus, in some embodiments, the method 211 may comprise, at block 215, executing a single LC on the requesting node to manage requests from applications on the requesting node to write to the copy of the file by transmitting requests to a CLM for read locks, the synchronization lock, and the write lock.

The methods described herein do not have to be executed in the order described, or in any particular order. Moreover, various activities described with respect to the methods identified herein can be executed in repetitive, serial, or parallel fashion. The individual activities of the methods shown in FIGS. 1 and 2 can also be combined with each other and/or substituted, one for another, in various ways. Information, including parameters, commands, operands, and other data, can be sent and received in the form of one or more carrier waves. Thus, many other embodiments may be realized.

The methods of distributed lock administration shown in FIGS. 1 and 2 can be implemented in various devices, as well as in a computer-readable storage medium, where the methods are adapted to be executed by one or more processors. Further details of such embodiments will now be described.

Figure 3:
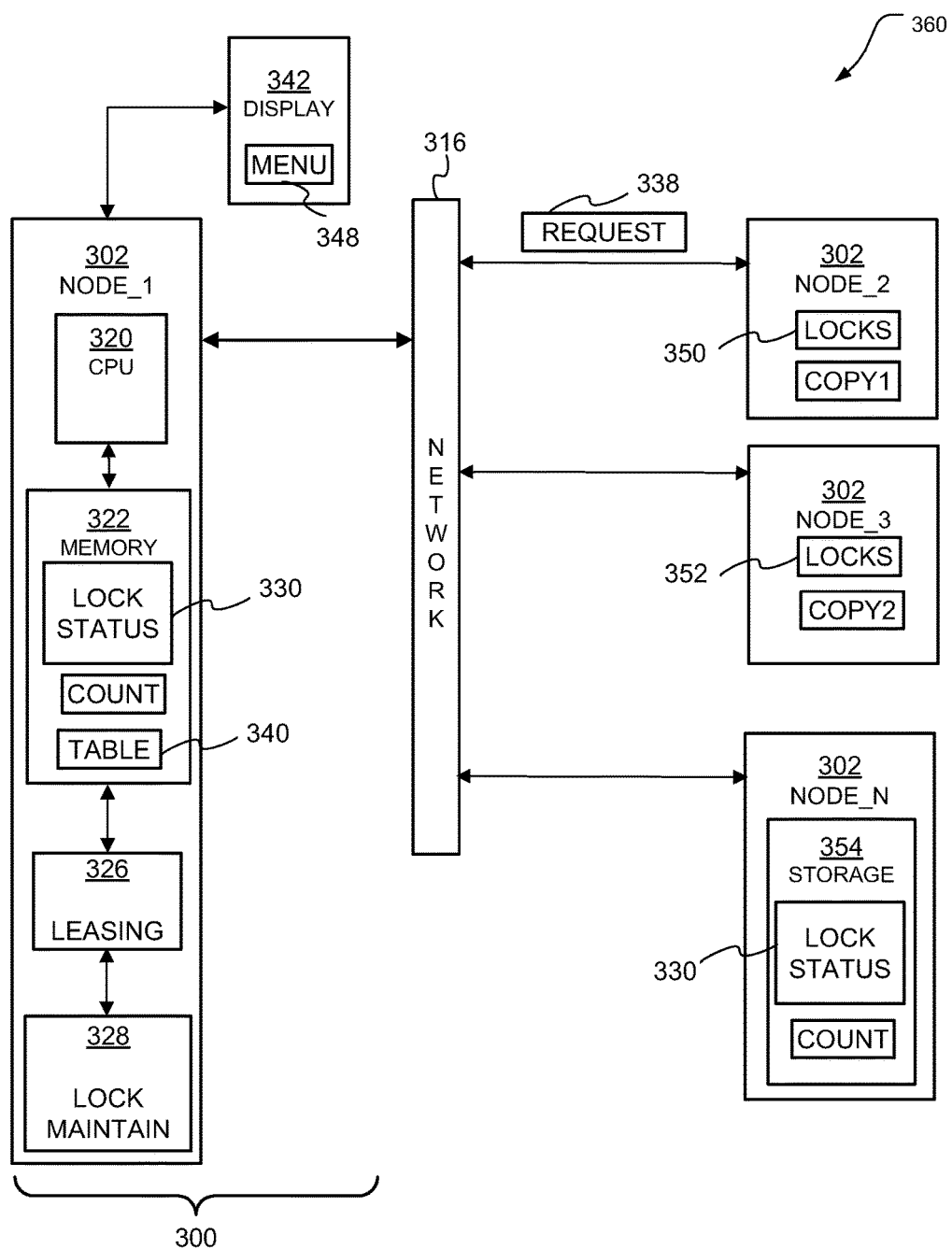
FIG. 3 is a block diagram of apparatus and systems according to various embodiments of the invention.

FIG. 3 is a block diagram of apparatus 300 and systems 360 according to various embodiments of the invention. Here it can be seen that an apparatus 300 used to administer distributed locks may comprise one or more processing nodes 302, one or more processors 320, memory 322, leasing modules 326, lock maintenance modules 328, and a display 342. The apparatus 300 may comprise a server, a client, a CLM, an LC, or some other networked processing node.

The processing nodes 302 may comprise physical machines or virtual machines, or a mixture of both. The nodes 302 may also comprise networked entities. In some basic implementations, the operations described can occur entirely within a single node 302.

In some embodiments then, an apparatus 300 may comprise a node (e.g., NODE_1) including a leasing module 326 to grant a synchronization lock with a renewable lease to a requesting node (e.g., NODE_2) included in a group of nodes 302 when a file having copies COPY1, COPY2, etc. distributed among the nodes 302 is in an unsynchronized state and when no write lock has already been granted.

The leasing module 326 can also be used to grant a write lock with a renewable lease to a write requesting node (e.g., NODE_2) included in the nodes 302 when the file is in a synchronized state and when the write lock has not already been granted.

In some embodiments, the apparatus 300 comprises a lock maintenance module 328 to maintain a synchronization lock while the renewable lease for the synchronization lock is not expired, and to maintain a write lock while the renewable lease for the write lock is not expired.

A CLM (e.g., NODE_1) can maintain a database of lock information, perhaps in a separate storage element 354, which may even reside on a different network, providing fault tolerance. Thus, the apparatus 300 may comprise a memory element 322, 354 to store a database comprising information 330 regarding the status of synchronization locks, write locks, and read locks for a group of nodes 302.

A single node 302 may include multiple parts of the CLM, and a hash table may be used by the CLM to manage the locks. Thus, in some embodiments, the apparatus 300 may further comprise a memory element 322 included in a node (e.g., NODE_1) housing the leasing module 326 and the lock maintenance module 328, the memory element 322 to store a hash table 340 associated with the file that includes hash tables associated with synchronization locks and write locks. Still further embodiments may be realized.

For example, it can be seen that a system 360 that operates to implement administration of distributed locks may comprise multiple instances of the apparatus 300. The system 360 might also comprise a cluster of nodes 302, including physical and virtual nodes. It should be noted that any of the nodes 302 may include any one or more of the elements explicitly shown in nodes NODE_1, NODE_N.

In some embodiments then, a system 360 can operate using multiple nodes: one node (e.g., NODE_1) to operate as a CLM, and other nodes (e.g., NODE_2, NODE_3) to act as an LC, generating lock requests 338, and receiving locks 350, 352 at appropriate times with respect to various instances of the file copies COPY1, COPY2. Additional nodes (e.g., NODE_N) may be used for storage, and or file processing.

One of the nodes, perhaps operating as a CLM, or otherwise, may comprise a memory element 322, 354 to store durations associated with renewable leases for synchronization locks, write locks, or both. The duration of leases can be adjusted based on network conditions, as noted previously.

The system 360 may operate to monitor read locks to determine whether any copy of the file COPY1, COPY2 is being accessed. Thus, the memory element 322, 354 may be used to store a count COUNT associated with read locks granted to some of the nodes 302 with respect to some of the copies COPY1, COPY2.

The nodes 302 may exist as a device embedded within another structure (e.g., as an embedded device), or as a regular desktop or laptop computer that includes a display 342 to show the activities conducted while the node 302 is active. Thus, the system 360 may also comprise a display 342 coupled to the nodes 302 to display visible indications of the activities conducted at the nodes 302.

The apparatus 300 and system 360 may be implemented in a machine-accessible and readable medium that is operational over one or more networks 316. The networks 316 may be wired, wireless, or a combination of wired and wireless. The apparatus 300 and system 360 can be used to implement, among other things, the processing associated with the methods 111 and 211 of FIGS. 1 and 2, respectively.

Modules may comprise hardware, software, and firmware, or any combination of these. Additional embodiments may be realized.

Figure 4:
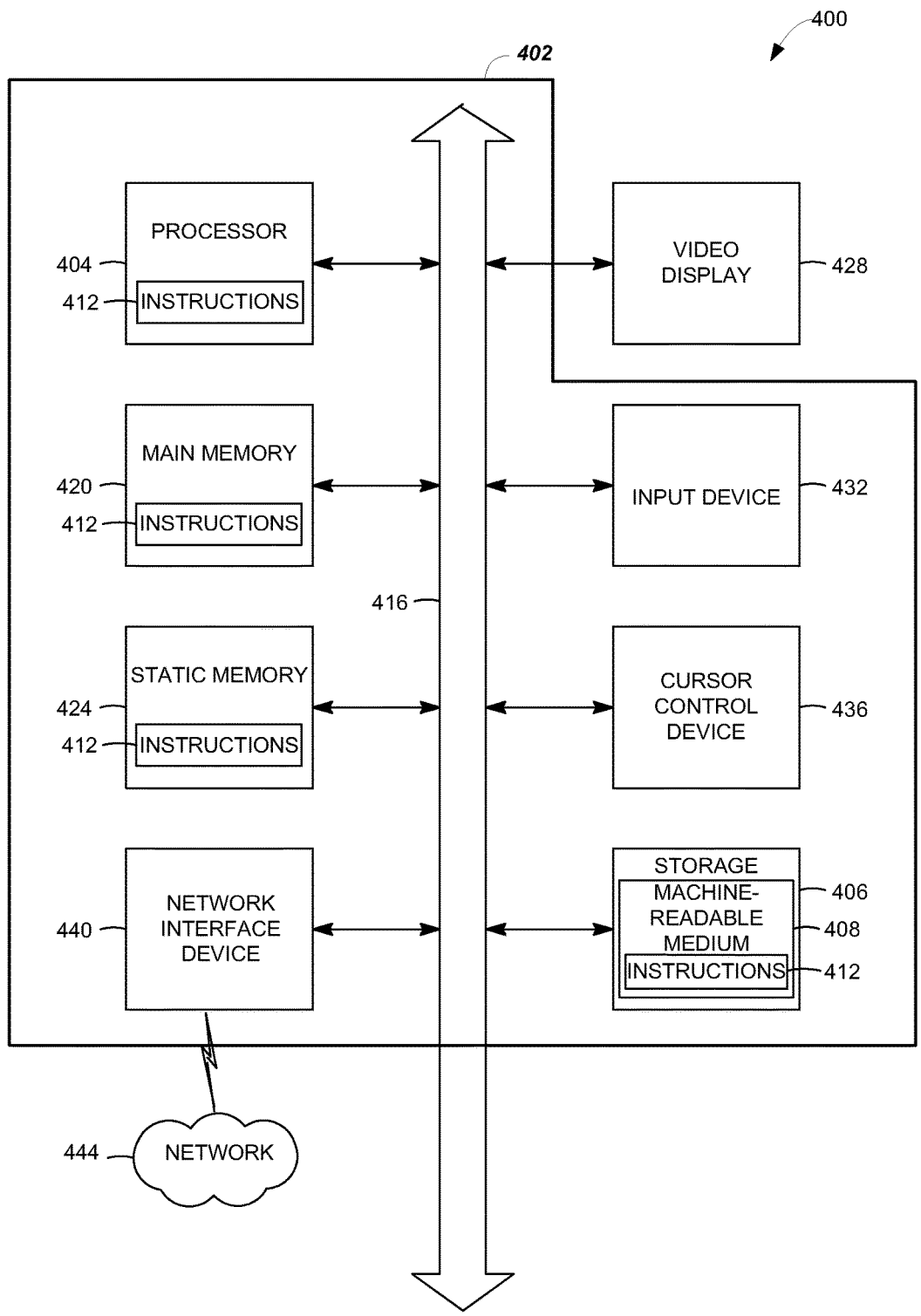
FIG. 4 is a block diagram of an article of manufacture, including a specific machine, according to various embodiments of the invention.

For example, FIG. 4 is a block diagram of an article 400 of manufacture, including a specific machine 402, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-oriented format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 400 of manufacture, such as a computer, a memory system, a magnetic or optical disk, some other storage device, a processor/chip/integrated circuit architecture and/or any type of electronic device or system may include one or more processors 404 coupled to a machine-readable medium 408 such as a memory (e.g., removable storage media, as well as any memory including an electrical, optical, or electromagnetic conductor) having instructions 412 stored thereon (e.g., computer program instructions), which when executed by the one or more processors 404 result in the machine 402 performing any of the actions described with respect to the methods above.

The machine 402 may take the form of a specific computer system having a processor 404 coupled to a number of components directly, and/or using a bus 416. Thus, the machine 402 may be similar to or identical to the apparatus 300 or system 360 shown in FIG. 3.

Turning now to FIG. 4, it can be seen that the components of the machine 402 may include main memory 420, static or non-volatile memory 424, and mass storage 406. Other components coupled to the processor 404 may include an input device 432, such as a keyboard, or a cursor control device 436, such as a mouse. An output device 428, such as a video display, may be located apart from the machine 402 (as shown), or made as an integral part of the machine 402.

A network interface device 440 to couple the processor 404 and other components to a network 444 may also be coupled to the bus 416. The instructions 412 may be transmitted or received over the network 444 via the network interface device 440 utilizing any one of a number of well-known transfer protocols (e.g., HyperText Transfer Protocol). Any of these elements coupled to the bus 416 may be absent, present singly, or present in plural numbers, depending on the specific embodiment to be realized.

The processor 404, the memories 420, 424, and the storage device 406 may each include instructions 412 which, when executed, cause the machine 402 to perform any one or more of the methods described herein. In some embodiments, the machine 402 operates as a standalone device or may be connected (e.g., networked) to other machines. In a networked environment, the machine 402 may operate in the capacity of a server or a client machine in server-client network environment, or as a peer machine in a peer-to-peer (or distributed) network environment.

The machine 402 may comprise a personal computer (PC), a tablet PC, a set-top box (STB), a PDA, a cellular telephone, a web appliance, a network router, switch or bridge, server, client, or any specific machine capable of executing a set of instructions (sequential or otherwise) that direct actions to be taken by that machine to implement the methods and functions described herein. Further, while only a single machine 402 is illustrated, the term "machine" shall also be taken to include any collection of machines that individually or jointly execute a set (or multiple sets) of instructions to perform any one or more of the methodologies discussed herein.

While the machine-readable medium 408 is shown as a single medium, the term "machine-readable medium" should be taken to include a single medium or multiple media (e.g., a centralized or distributed database, and/or associated caches and servers, and or a variety of storage media, such as the registers of the processor 404, memories 420, 424, and the storage device 406 that store the one or more sets of instructions 412. The term "machine-readable medium" shall also be taken to include any medium that is capable of storing, encoding or carrying a set of instructions for execution by the machine and that cause the machine 402 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a stand-alone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Implementing the apparatus, systems, and methods described herein may operate to make application access to files more efficient, with improved retention of data when multiple changes are made to distributed copies of the same file. More efficient allocation of processing resources, and increased user satisfaction may result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

APPENDIX A

CLM FILE HASH TABLE ENTRY

```
Hash(Filename) =>{
            File_State => (SYNCED/TRANSIENT),
            RL => {
                RL1 => {
                    Lockid,
                    Lockingpid,
                    Lockinghostid,
                    LockGrantTime,
                    LockDuration,
                    LockRenewalDelay,
                    LockedFileInstanse(hostid:\\FileLocation)};
                RL2 => {...};
                .
                RLn => {...};
                RL{Count} => {...};
                RLCount};
            WL => { //Only one WL per file at a time
                State(0=Inactive, 1=Active),
                Lockingpid,
                LockingHostid,
                LockGrantTime,
                LockDuration,
                LockRenewalDelay,
                LockedFileInstanse(Hostid:\\FileLocation)
                };
            SYNCWL => { //Only one SYNCWL per file at a time
                Lockingpid,
                LockingHostid,
                LockGrantTime,
                LockDuration,
                LockRenewalDelay,
                LockedFileInstance(Hostid:\\FileLocation)
         (Replication provider file), CorrepsondingRLCount
                };
            SYNC_REQUIRED => {
                    Hostid1,
                    Hostid2,
                    .
                    Hostidn
                };
            };
```

LC NODE HASH TABLE ENTRY

```
Lock_Data    =>{
            RL => {
                RL1 => {
                    LockingPid,
                    LockedFileInstance(Hostid:\\FileLocation),
                    NextLockRenewalTimeStamp
                };
                RL2 => {....};
                .
                RLn => {...};
            };
            WL => {
                WL1 => {
                    LockingPid,
                    LockedFileInstance(Hostid:\\FileLocation),
                    NextLockRenewalTimeStamp
                };
                WL2 => {...};
                .
                WLn => {...};
            };
            SYNCWL => {
                SYNCWL1 => {
                    pid_of_DFS_sync_process,
                    Lockedfile(localFilelocation),
                    ReplicationProvider(Hostid:\\FileLocation),
                    NextLockRenewalTimeStamp
                };
                SYNCWL2 => {...};
                .
                SYNCWLn => {...};
            };
};
```

What is claimed is:

1. An apparatus, comprising:
a first processor to grant a synchronization lock with a renewable lease to a requesting node included in a group of nodes when a file having copies distributed among the nodes including the requesting node is in an unsynchronized state and when no write lock has already been granted to the requesting node and to any other nodes in the group of nodes, wherein the synchronization lock is to disable modification of the file, to enable synchronization of one of the copies on the requesting node to another one of the copies comprising a synchronization master copy on another one of the nodes, and wherein the first processor is to grant a write lock with a renewable lease to a write requesting node included in the nodes when the file is in a synchronized state and when the write lock has not already been granted, wherein the write lock is to disable granting the synchronization lock, to enable modification of the file, wherein if the file is in an unsynchronized state when the write lock is requested, the first processor causes nodes in the group of nodes that have not synchronized their copy of the file to the synchronization master copy to immediately synch theft copy of the file to the synchronization master copy before the write lock is granted; and
a second processor to maintain the synchronization lock while the renewable lease for the synchronization lock is not expired, and to maintain the write lock while the renewable lease for the write lock is not expired.

2. The apparatus of claim 1, further comprising:
a memory element to store a database comprising information regarding status of the synchronization lock and the write lock for the group of nodes.

3. The apparatus of claim 1, further comprising:
a memory element included in a node housing the first processor and the second processor, the memory element to store a hash table associated with the file that includes hash tables associated with the synchronization lock and the write lock.

4. The apparatus of claim 1, wherein the first processor is to refrain from granting the synchronization lock when the file having copies distributed among the nodes is in a synchronized state.

5. A system, comprising:
a first node comprising a first processor to grant a synchronization lock with a renewable lease to a requesting node included in a group of nodes when a file having copies distributed among the nodes including the requesting node is in an unsynchronized state and when no write lock has already been granted to the requesting node and to any other nodes in the group of nodes, wherein the synchronization lock is to disable modification of the file, to enable synchronization of one of the copies on the requesting node to another one of the copies comprising a synchronization master copy on another one of the nodes, and wherein the first processor is to grant a write lock with a renewable lease to a write requesting node included in the nodes when the file is in a synchronized state and when the write lock has not already been granted, wherein the write lock is to disable granting the synchronization lock, to enable modification of the file, the first processor, wherein if the file is in an unsynchronized state when the write lock is requested, the first processor causes nodes in the group of nodes that have not synchronized their copy of the file to the synchronization master copy to immediately synch their copy of the file to the synchronization master copy before the write lock is granted;
a second processor to maintain the synchronization lock while the renewable lease for the synchronization lock is not expired, and to maintain the write lock while the renewable lease for the write lock is not expired; and a plurality of second nodes comprising the group of nodes.

6. The system of claim 5, further comprising, a memory element in the first node to store durations associated with the renewable lease for the synchronization lock and the renewable lease for the write lock.

7. The system of claim 5, further comprising:
a memory element in the first node to store a count associated with read locks granted to some of the second nodes with respect to some of the copies.

8. A processor-implemented method to execute on one or more processors that perform the method, comprising:
granting a synchronization lock with a renewable lease to a requesting node included in a group of nodes when a file having copies distributed among the nodes including the requesting node is in an unsynchronized state and when no write lock has already been granted to the requesting node and to any other nodes in the group of nodes, wherein the synchronization lock is to disable modification of the file, to enable synchronization of one of the copies on the requesting node to another one of the copies comprising a synchronization master copy on another one of the nodes;
granting a write lock with a renewable lease to a write requesting node included in the nodes when the file is in a synchronized state and when the write lock has not already been granted, wherein the write lock is to disable granting the synchronization lock, to enable modification of the file, wherein if the file is in an unsynchronized state when the write lock is requested, causing nodes in the group of nodes that have not synchronized their copy of the file to the synchronization master copy to immediately synch their copy of the file to the synchronization master copy before the write lock is granted;
maintaining the synchronization lock while the renewable lease for the synchronization lock is not expired; and
maintaining the write lock while the renewable lease for the write lock is not expired.

9. The method of claim 8, further comprising:
receiving a request from the requesting node to synchronize the one of the copies on the requesting node; and
granting the synchronization lock to the requesting node only if the synchronization lock or the write lock have not already been granted to another node included in the group of nodes.

10. The method of claim 8, further comprising:
transmitting an indication of a failure to grant a file lock request when the synchronization lock or the write lock have already been granted; and
transmitting a time to retry submitting the request.

11. The method of claim 8, further comprising:
determining that one of the renewable lease for the synchronization lock or the renewable lease for the write lock have expired; and
releasing the synchronization lock or the write lock, respectively, in response to the determining.

12. The method of claim 8, further comprising:
determining that a modification to one of the copies has occurred at a modifying one of the nodes; and transmitting a non-immediate synchronization command to nodes in the group that have not synchronized their corresponding copies of the file to the synchronization master copy.

13. The method of claim 8, further comprising:

determining that the file is in the unsynchronized state and that the write lock has been requested; and transmitting an immediate synchronization command to nodes in the group that have not synchronized their corresponding copies of the file to the synchronization master copy.

14. The method of claim 8, further comprising:

granting a read lock to a read requesting node included in the group when other read locks or a write lock exist, and when the file is not in the unsynchronized state on at least one node in the group that is not the same as the read requesting node.

15. The method of claim 8, further comprising:

adjusting a duration of the renewable lease for at least one of the synchronization lock or the write lock based on network traffic loading.

16. The method of claim 8, further comprising:

granting a request to renew the synchronization lock for a fixed synchronization duration if the synchronization lock has not yet expired; and granting a request to renew the write lock for a fixed write duration if the write lock has not yet expired.

17. A processor-implemented method to execute on one or more processors that perform the method, comprising:

receiving a synchronization lock with a renewable lease at a requesting node included in a group of nodes when a copy of a file having multiple copies distributed among the nodes including the requesting node is in an unsynchronized state on the requesting node, wherein no write lock has already been granted to the requesting node and to any other nodes in the group of nodes, and wherein the synchronization lock is to disable modification of the file, to enable synchronization of the copy to another one of the copies comprising a synchronization master copy on another one of the nodes in the group; and receiving a write lock with a renewable lease when the file is in a synchronized state and when the write lock has not already been granted, wherein the write lock is to disable granting the synchronization lock, to enable modification of the copy on the requesting node when the requesting node has requested the write lock, wherein if the file is in an unsynchronized state when the write lock is requested, nodes in the group of nodes that have not synchronized their copy of the file to the synchronization master copy immediately synch their copy of the file to the synchronization master copy before the write lock is received.

18. The method of claim 17, further comprising:

receiving a non-immediate synchronization command from a centralized lock manager (CLM) at the requesting node;

refraining from synchronizing the copy on the requesting node; and transmitting a message to the CLM from the requesting node to indicate that synchronization of the copy will occur at a later time.

19. The method of claim 17, further comprising:

transmitting a message to a centralized lock manager (CLM) from the requesting node to indicate that synchronization of the copy has occurred.

20. The method of claim 17, further comprising:

executing a single lock client on the requesting node to manage requests from applications on the requesting node to write to the copy of the file by transmitting requests to a centralized lock manager for read locks, the synchronization lock, and the write lock.

21. The method of claim 17, further comprising:

renewing the renewable lease on one of the synchronization lock or the write lock with a centralized lock manager when a selected amount of time remains on the renewable lease.

\* \* \* \* \*